United States Patent [19]

Bostian et al.

[11] 3,961,034
[45] June 1, 1976

[54] METHOD OF REMOVING SODIUM THIOSULFATE FROM A HYDROSULFITE REACTION MIXTURE

[75] Inventors: Logan C. Bostian, Virginia Beach; Charles E. Winslow, Norfolk, both of Va.

[73] Assignee: Virginia Chemicals Inc., Portsmouth, Va.

[22] Filed: Sept. 25, 1974

[21] Appl. No.: 509,160

[52] U.S. Cl. .............................. 423/181; 210/37 R; 260/542; 423/182; 423/514; 423/515
[51] Int. Cl.² .................................... C01B 17/64
[58] Field of Search .............. 210/37, 38; 203/66; 423/181, 514, 515, 512, 182; 260/542

[56] References Cited
UNITED STATES PATENTS

| | | | |
|---|---|---|---|
| 2,559,529 | 7/1951 | Bauman | 210/37 |
| 3,186,940 | 6/1965 | Vajna | 210/37 |
| 3,397,142 | 8/1968 | Guth et al. | 210/37 |
| 3,420,773 | 1/1969 | Selmeszi | 210/37 |
| 3,466,139 | 9/1969 | Mihara et al. | 210/37 |
| 3,585,127 | 6/1971 | Salem | 210/37 |
| 3,711,401 | 1/1973 | Hamilton et al. | 210/37 |
| 3,718,732 | 2/1973 | Winslow, Jr. et al. | 423/539 |
| 3,842,002 | 10/1974 | Boari | 210/37 |

OTHER PUBLICATIONS

Seamster et al., "Ion Exchange Becomes Powerful Processing Tool", Chemical Engineering, Aug. 22, 1960, pp. 115–120.

Skoog et al., *Fundamentals of Analytical Chemistry*, pp. 760–763, Holt, Rinehart, and Winston Co., copyright 1963.

*Primary Examiner*—Oscar R. Vertiz
*Assistant Examiner*—Wayne A. Langel
*Attorney, Agent, or Firm*—Depaoli & O'Brien

[57] ABSTRACT

Filtrate from a formate-sodium hydrosulfite preparation contains valuable amounts of sodium formate and sodium bisulfite, which are raw materials for the synthesis of sodium hydrosulfite. The filtrate also contains sodium thiosulfate which is a known catalyst for the decomposition of sodium hydrosulfite and, therefore, must not be introduced in with the raw materials. Accordingly the method concerns removing the sodium thiosulfate by means of ion exchange with a resin and directing the valuable sodium bisulfite and sodium formate effluent including methanol and water to a distillation column.

4 Claims, 1 Drawing Figure

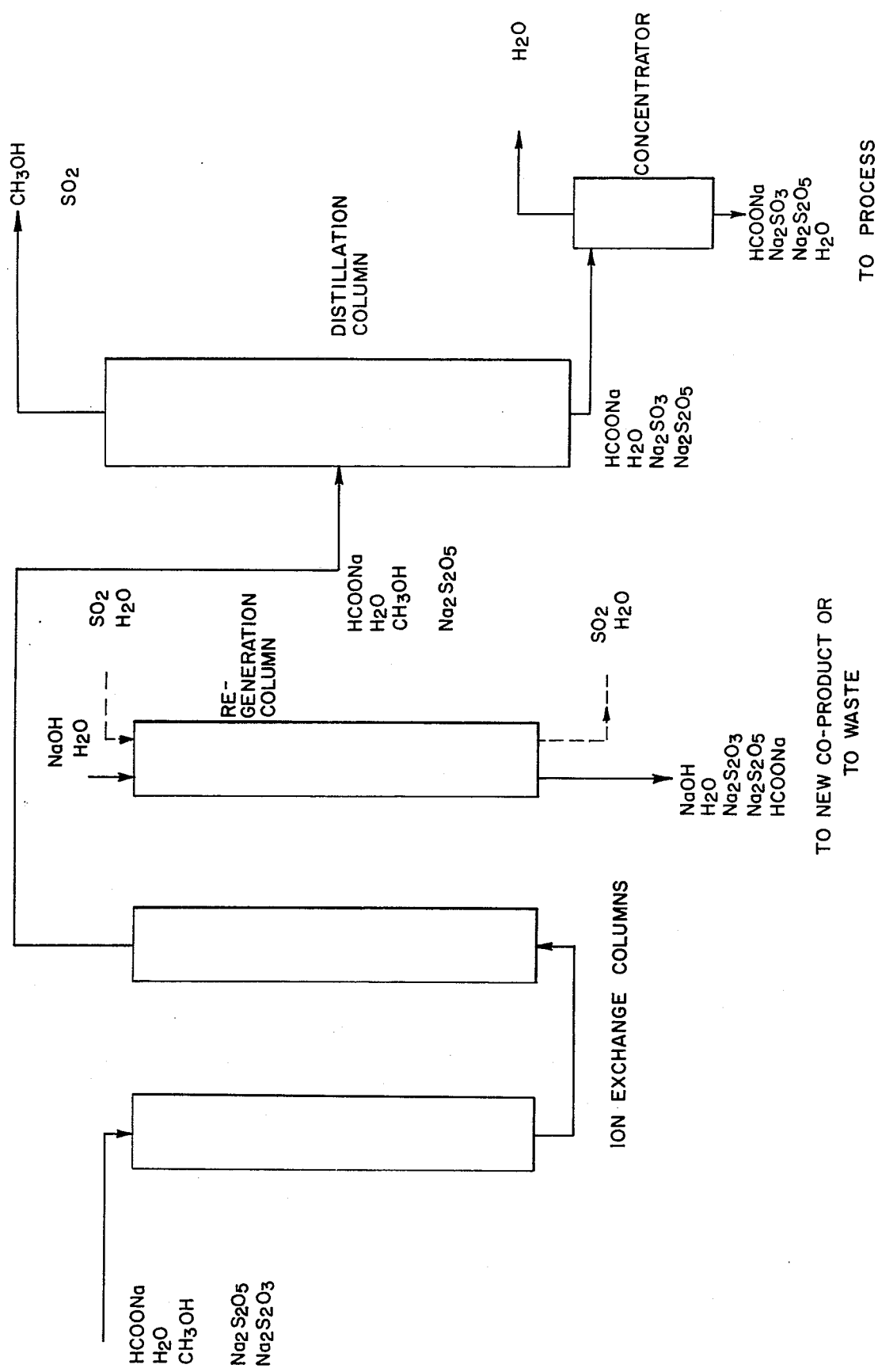

3,961,034

METHOD OF REMOVING SODIUM THIOSULFATE FROM A HYDROSULFITE REACTION MIXTURE

CITED REFERENCES TO RELATED APPLICATION:

None.

BACKGROUND OF THE INVENTION:

1. Field of the Invention

Synthesis of sodium hydrosulfite, particularly selective removal of sodium thiosulfate from a mixture of sodium thiosulfate, sodium formate and sodium bisulfite, such that the valuable sodium formate and sodium bisulfite may be recycled in the manufacturing process.

2. Description of the Prior Art

In the prior art of formate-sodium hydrosulfite synthesis the sodium formate and sodium bisulfite, being contaminated by sodium thiosulfate, are not available for recycling into the sodium hydrosulfite manufacturing process. Consequently, such quantities of contaminated sodium formate and sodium bisulfite are discarded or sold as low value by-product.

SUMMARY OF THE INVENTION

According to the present invention, sodium thiosulfate is removed from a hydrosulfite reaction medium also containing sodium formate and sodium bisulfite. The hydrosulfite reaction mixture is fed into an ion exchange column containing resin, such that the thiosulfate ion is absorbed by the resin; effluent from said first ion exchange column is fed into a second column, such that any "breakthrough" of thiosulfate is absorbed, and the effluent containing sodium bisulfite and sodium formate is directed back to the hydrosulfite reaction process. The ion exchange columns may be regenerated by feeding caustic soda and obtaining the sodium thiosulfate-containing effluent as a co-product.

BRIEF DESCRIPTION OF THE DRAWINGS

FIG. 1 is a simplified flow sheet, showing feeding of the hydrosulfite reaction filtrate into a series of ion exchange columns containing resin; directing the sodium formate-sodium bisulfite effluent to a distillation column in a hydrosulfite production synthesis unit; and regenerating the ion exchange columns with caustic soda.

DESCRIPTION OF THE PREFERRED EMBODIMENTS

Sodium thiosulfate is a byproduct of the formate-hydrosulfite process, probably being formed by decomposition of hydrosulfite. Thiosulfate is especially harmful within a hydrosulfite reaction mixture because it acts in a catalytic manner to promote further decomposition of hydrosulfite. The present method enables removal selectively of the thiosulfate from the reaction filtrate, such that the sodium bisulfite and sodium formate also contained the filtrate may be reused. Heretofore the presence of thiosulfate in the filtrate has effectively prohibited reuse of these reactants.

In order to achieve nearly complete saturation of the resin with thiosulfate and, therefore, minimize loss of formate or bisulfite, two ion exchange towers in series are recommended. A third column may be provided for regeneration while the other two ion exchange columns are in use removing thiosulfate. Description of a proposed ion exchange method follows:

EXAMPLE

ION EXCHANGE COLUMNS

A pyrex glass tube 34 mm. i.d. and 4 ft. in length was constructed with a bottom outlet and hose so that any desired liquid level could be maintained in the column. 420 g. of IRA-47 resin made by Rohm and Haas was placed in the column, so that the height of the bed was 25 inches. The calculated volume of resin was 0.0195 cubic feet. Resin was retained in the column by a piece of porous metal cloth (Dutch twill) glued to a one-hole rubber stopper at the bottom of the column.

PREPARATION OF RESIN

The IRA-47 resin is shipped in the chloride form. To prepare it for use, it is necessary to convert it first to the hydroxyl form and then to either the formate or bisulfite form.

The resin was treated with 70 g. NaOH dissolved in 2 liters of water. The resin became noticeably lighter in color as the chloride ions were replaced with hydroxyl ions. The bed was then flushed with water, and the washings combined with the effluent from caustic treatment. The combined effluent totalled 3,280 ml. A sample of 20 ml. required 52.3 ml. of 0.1N HCl. The balance showed:

$$\frac{70}{40} \times 1000 = 1{,}750 \text{ milliequivalents OH added}$$

$$3280 \times \frac{5.23}{20} = \frac{858 \text{ milliequivalents OH recovered}}{892 \text{ milliequivalents OH on resin}}$$

To convert the resin to the bisulfite form, 128 g. of sulfur dioxide was dissolved in 2 liters of water and passed through the bed. The heat evolved during neutralization was noticeable, and one could follow the progress of the reaction by noting where the "hot spot" was located. Also, the color of the resin darkened when the hydroxyl ions were replaced with bisulfite ions.

REMOVING SODIUM THIOSULFATE

A synthetic filtrate was made up by adding 8276 g. of methanol to 2525 g. of aqueous "bottoms". The aqueous "bottoms" were prepared by dissolving 1481 g. $Na_2S_2O_3$ and 1380 g. HCOONa in 6335 g. of water. The mixture was cloudy and a yellow solid was removed by filtration. A 5 ml. sample of the filtrate required 4.0 ml. of 0.1N iodine to the iodine starch end point.

Both columns were in the bisulfite form at the start. The feed of synthetic filtrate was continued until the product of the first column possessed a titer of 4 ml. per 5 ml. of sample, which is equal to that of the feed. This indicated that column No. 1 was saturated with thiosulfate. Product from column No. 2 still showed a titer of only 1 drop of 0.1 N iodine per 5 ml. of sample. The material balances were:

| | | Thiosulfate | |
|---|---|---|---|
| Feed | 7544 g. × 0.0144 | = 108.6 g. | In |

-continued

| | | | | |
|---|---|---|---|---|
| Product No. 1 | 1703 | | | |
| Product No. 2 | 6467 | | | |
| Rinse No. 1 | 1959 × 0.00661 | = | 13.0 g. | |
| Rinse No. 2 | 1967 × 0.0013 | = | 2.5 | |
| | | | 15.5 g. | |
| Regeneration No. 1 | 3909 × 0.0147 | = | 57.5 | |
| Regeneration No. 2 | 3996 × 0.00995 | = | 36.7 | |
| | | | 94.2 | |
| | | | 109.7 | Out |

| Sulfite | | | | |
|---|---|---|---|---|
| Feed | 7554 × 0.048 | = | 362.1 g. | 2.873 mols |
| Column No. 1 | | | | 1.054 |
| Column No. 2 | | | | 1.025 |
| | | | | 4.952 mols In |
| Product No. 1 | 1703 × 5.75% $Na_2SO_3$ | = | 97.92 g. | |
| Product No. 2 | 6476 × 6.75 | = | 443.88 | |
| Rinse No. 1 | 1959 × 3.15 | = | 61.7 | |
| Rinse No. 2 | 1967 × 0.43 | = | 8.5 | |
| | | | 611.95 g. = | 4.857 mols |
| Regeneration No. 1 | 3909 × 0.17% | = | 6.64 g. | |
| Regeneration No. 2 | 3996 × 0.36% | = | 14.38 | |
| | | | 21.02 g. = | 0.167 mols |
| | | | | 5.024 mols Out |

The regeneration solutions were rechecked with the following results:

On Column No. 1 before regeneration:
$S_2O_3^=$    0.727 eq.
$HSO_3^-$    0.053 eq.
$HCOO^-$    0.023 eq.
         0.803 eq.

On Column No. 2 before regeneration:
$S_2O_3^=$    0.465 eq.
$HSO_3^-$    0.114 eq.
$HCOO^-$    0.066 eq.
         0.645 eq.

These results show that column No. 1 was indeed close to saturation (90.5%) while column No. 2 was 72% of saturation. Thus, one can saturate one column while using the second column to prevent breakthrough.

As illustrated in FIG. 1 the ion exchange equipment would consist of three towers, each containing IRA-47 resin. Two of the columns are operated in series, while the third is being regenerated.

According to FIG. 1, filtrate from the process is fed to the first of two ion exchange columns in series. Effluent from the first column is fed to the second column, which insures that no thiosulfate is carried through. Effluent from the second column is fed to a distillation column where methanol is distilled overhead. Bottoms from the distillation column are fed to a concentrator, where excess water is removed. Bottoms from the concentrator are fed to the hydrosulfite process. It will probably be necessary to add a little $SO_2$ to this product to convert any sulfite to bisulfite.

Regeneration of the ion exchange column is illustrated for the third column. A dilute caustic soda solution is passed through the column to remove thiosulfate, and the effluent can be sold as co-product or sent to waste if too dilute. Then a dilute $SO_2$ in water solution is passed through the column to replace the hydroxyl ions with bisulfite ions.

Various types of distillation columns may be employed and, of course, various other alkaline thiosulfates may be removed, according to the present method.

We claim:
1. A method for purifying filtrate from a formate-sodium hydrosulfite process by removal of thiosulfate ions therefrom, comprising:
A. providing three beds of an ion exchange resin having exchangable anions selected from the group consisting of formate and bisulfite ions, said beds being sequentially interconnected;
B. passing said filtrate sequentially through two of said beds;
C. feeding effluent from a second of said two beds to a distillation column and removing methanol therefrom as overhead;
D. feeding bottoms from said distillation column to a concentrator and removing excess water therefrom; and
E. when thiosulfate in effluent from the first of said two beds is found by analysis to be substantially equal to said thiosulfate in said filtrate, regenerating said first of said two beds by feeding a dilute solution of sodium hydroxide therethrough while passing said filtrate sequentially through the second and third of said three beds.

2. The method of claim 1 wherein bottoms from said concentrator are returned to said formate-sodium hydrosulfite process.

3. The method of claim 1 wherein said first of said two beds is further regenerated by passing water having sulfur dioxide dissolved therein through said first of said two beds after said regeneration with said dilute sodium hydroxide.

4. The method of claim 1 wherein said first of said two beds is further regenerated by passing dilute formic acid therethrough after said regeneration with said dilute sodium hydroxide.

* * * * *